(12) United States Patent
Zhang

(10) Patent No.: US 12,028,649 B2
(45) Date of Patent: Jul. 2, 2024

(54) WIRELESS SCREEN PROJECTION METHOD, RECEIVER AND COMPUTER-READABLE STORAGE MEDIUM

(71) Applicant: C-Smartlink Information Technology Co., Ltd., Shenzhen (CN)

(72) Inventor: Wenfeng Zhang, Shenzhen (CN)

(73) Assignee: C-SMARTLINK INFORMATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/849,690

(22) Filed: Jun. 26, 2022

(65) Prior Publication Data

US 2023/0379433 A1 Nov. 23, 2023

(30) Foreign Application Priority Data

May 17, 2022 (CN) .......................... 202210543016.1

(51) Int. Cl.
*H04N 7/04* (2006.01)
*G06F 3/14* (2006.01)
*H04W 88/06* (2009.01)

(52) U.S. Cl.
CPC .............. *H04N 7/04* (2013.01); *G06F 3/1454* (2013.01); *H04W 88/06* (2013.01)

(58) Field of Classification Search
CPC ........ H04N 7/04; H04N 7/15; H04N 7/84–87; H04N 5/04; H04N 5/2256; H04N 5/2354; H04N 5/4403; G06F 3/14; G06F 3/1454; H04W 88/06; H04W 76/10; H04W 76/14; H04L 65/403; H04L 12/18; H04L 63/083; H04L 63/209
USPC ......................................................... 709/217
See application file for complete search history.

(56) References Cited

U.S. PATENT DOCUMENTS

| | | | | |
|---|---|---|---|---|
| 11,044,329 B2* | 6/2021 | Weis | ...................... | H04L 67/535 |
| 11,586,409 B1* | 2/2023 | Zhong | .................... | G06F 3/1431 |
| 2005/0036509 A1* | 2/2005 | Acharya | ............ | H04N 21/4753 |
| | | | | 370/467 |
| 2008/0013504 A1* | 1/2008 | Nishibayashi | ....... | G09G 3/2096 |
| | | | | 370/338 |
| 2010/0146614 A1* | 6/2010 | Savoor | .................. | H04L 9/3263 |
| | | | | 726/10 |
| 2011/0304686 A1* | 12/2011 | Qiu | ........................ | G06Q 10/00 |
| | | | | 348/14.08 |
| 2012/0038825 A1* | 2/2012 | Kanonich | ............. | A63F 13/332 |
| | | | | 348/E5.009 |

(Continued)

*Primary Examiner* — James N Fiorillo

(57) ABSTRACT

A wireless screen projection method for a wireless network including a receiver that includes a first input module and at least one transmitter, includes: switching, using the receiver, to a preemption enabled mode in response to a first trigger signal received by the receiver that is generated by the first input module in response to a user's first operation on the first input module; and in the preemption enabled mode, sending, using the receiver, a projection instruction to a target transmitter in response to a screen preemption request sent by the target transmitter. The projection instruction is to trigger the target transmitter to send audio and video data of a terminal device connected to the target transmitter to the receiver through the wireless network, and the receiver is to transmit the audio and video data to a display device connected to the receiver.

19 Claims, 8 Drawing Sheets

(56) References Cited

U.S. PATENT DOCUMENTS

| | | | | |
|---|---|---|---|---|
| 2013/0031174 | A1* | 1/2013 | Baba | H04L 65/403 |
| | | | | 709/204 |
| 2013/0113993 | A1* | 5/2013 | Dagit, III | G06F 3/04883 |
| | | | | 348/734 |
| 2014/0040781 | A1* | 2/2014 | Epstein | G06F 1/1632 |
| | | | | 715/753 |
| 2014/0047339 | A1* | 2/2014 | Epstein | G06F 3/023 |
| | | | | 715/719 |
| 2014/0141725 | A1* | 5/2014 | Jesme | H04W 76/10 |
| | | | | 455/66.1 |
| 2014/0375754 | A1* | 12/2014 | Talukder | H04N 5/76 |
| | | | | 348/14.08 |
| 2016/0050394 | A1* | 2/2016 | Segal | H04N 7/15 |
| | | | | 348/14.08 |
| 2016/0266864 | A1* | 9/2016 | Rajendran | H04L 12/1822 |
| 2017/0187703 | A1* | 6/2017 | Enrique Salpico | H04L 63/162 |
| 2017/0251515 | A1* | 8/2017 | Altman | H04W 24/02 |
| 2018/0121150 | A1* | 5/2018 | Lin | H04M 3/563 |
| 2020/0187273 | A1* | 6/2020 | Smith | H04L 67/10 |
| 2020/0314385 | A1* | 10/2020 | Kang | H04N 7/147 |
| 2021/0064324 | A1* | 3/2021 | Liao | H04W 4/80 |
| 2021/0211601 | A1* | 7/2021 | Li | H04N 21/43615 |
| 2021/0219198 | A1* | 7/2021 | Lin | H04W 36/08 |
| 2022/0116237 | A1* | 4/2022 | Pang | G06F 3/04162 |
| 2022/0224736 | A1* | 7/2022 | Cheevers | H04N 7/147 |
| 2022/0224968 | A1* | 7/2022 | Wang | G06F 3/1423 |
| 2022/0308822 | A1* | 9/2022 | Xu | H04W 12/50 |
| 2022/0343648 | A1* | 10/2022 | Chen | G06V 40/174 |
| 2023/0039861 | A1* | 2/2023 | Wang | G06F 3/0488 |
| 2023/0049074 | A1* | 2/2023 | Wang | H04W 76/10 |
| 2023/0076343 | A1* | 3/2023 | Sui | A63F 13/44 |
| 2023/0140769 | A1* | 5/2023 | Zhou | H04L 67/12 |
| | | | | 370/254 |
| 2023/0195403 | A1* | 6/2023 | Li | G06F 3/011 |
| | | | | 345/156 |
| 2023/0328495 | A1* | 10/2023 | Alathur | H04W 76/10 |
| | | | | 455/41.2 |

* cited by examiner

WIRELESS SCREEN PROJECTION METHOD, RECEIVER AND COMPUTER-READABLE STORAGE MEDIUM

CROSS REFERENCE TO RELATED APPLICATIONS

This application claims priority on Patent Application No. 202210543016.1, which is filed in People's Republic of China on May 17, 2022, which is hereby incorporated by reference herein as if set forth in its entirety.

BACKGROUND

1. Technical Field

The present disclosure generally relates to wireless screen projection technologies, and particularly to a wireless screen projection method and a receiver to implement the method.

2. Description of Related Art

A wireless screen projection/mirroring device refers to a device that allows a terminal device to wirelessly synchronize or project the content to be displayed on a large display screen. For example, when a user needs to show the document content on mobile phones, tablet computers and other terminal devices to others, the wireless screen projection device can play a great auxiliary role. Wireless screen projection can be implemented by software and hardware. Wireless screen projection by software tends to have the disadvantages of high delay and instability. Therefore, wireless screen projection by hardware is more commonly used.

One conventional wireless screen projection device typically includes a transmitter and a receiver that can be wirelessly connected to each other, such as by WiFi connection. The transmitter is provided with a data transmission interface such as a USB interface and an HDMI interface for connecting with a computer (e.g., notebook computer) through a data cable, and a wireless transmission module (e.g., a WiFi module) for realizing wireless connection with the receiver. The receiver is provided with a data transmission interface such as an HDMI interface for connecting with a large-size display screen or a projector through a data cable, and a wireless transmission module (e.g., a WiFi module) for realizing wireless connection with the transmitter. When wireless projection is required, the transmitter needs to be connected to a computer (e.g., notebook computer), and the receiver needs to be connected to a large-size display or projector. The screen content on the display screen of the computer can be sent through the transmitter to the receiver and presented on the large-size display or projector.

In order to achieve more intelligent interaction, the transmitter of the conventional wireless screen projection device typically includes one or more physical keys. In a conference scenario where multiple transmitters and a single receiver form a network, it is convenient for each user to realize functions such as one-click screen projection or one-click preemption by operating the keys of the transmitter. In the above-mentioned scenario, a user can preempt the screen at any time by operating the keys of the transmitter, which causes the content currently being displayed on the display to be switched at any time, causing confusion in the meeting order. Additionally, the function of the transmitter of the conventional wireless screen projection device is limited.

Therefore, there is a need to provide a method to overcome the above-mentioned problems.

SUMMARY

One objective of the present disclosure is to solve at least one of the above-mentioned problems by providing a wireless screen projection method and device that can effectively control the authority of each transmitter to preempt the screen while allowing that each user can still have the function of preempting the screen by operating a key of the transmitter.

In a first aspect, a wireless screen projection method for a wireless network including a receiver that includes a first input module and at least one transmitter, includes: switching, using the receiver, to a preemption enabled mode in response to a first trigger signal received by the receiver that is generated by the first input module in response to a user's first operation on the first input module; and in the preemption enabled mode, sending, using the receiver, a projection instruction to a target transmitter in response to a screen preemption request sent by the target transmitter. The projection instruction is to trigger the target transmitter to send audio and video data of a terminal device connected to the target transmitter to the receiver through the wireless network, and the receiver is to transmit the audio and video data to a display device connected to the receiver.

In a second aspect, a receiver is provided. The receiver is suitable for use in a wireless network including the receiver, a wireless router and at least one transmitter. The receiver includes a first storage, a first processor, a first an input module, a first program, a first WiFi module and a wireless AP. The first processor is configured to execute the first program stored in the first storage, so as to implement the wireless screen projection method described above.

In a third aspect, a computer-readable storage medium is provided, on which a computer program is stored, and when the computer program is executed by a processor, the steps of the wireless screen projection method described above are implemented.

In a fourth aspect, a computer program product is provided, which includes a computer program, which, when executed by a processor, the steps of the wireless screen projection method described above are implemented.

According to the technical solutions of the first aspect to the fourth aspect provided by the present disclosure, a moderator can use the first input module of the receiver to control the screen preemption permission of each transmitter. The request for preempting the screen can be initiated by each participant by pressing a key of the transmitter. Each transmitter is allowed to preempt the screen only after confirmation by the moderator of the conference. Without increasing the workload of each participant, the screen preemption permission of each transmitter is effectively controlled, which can ensure that each participant can demonstrate their display materials in an orderly manner, and maintain the presentation order of the conference.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
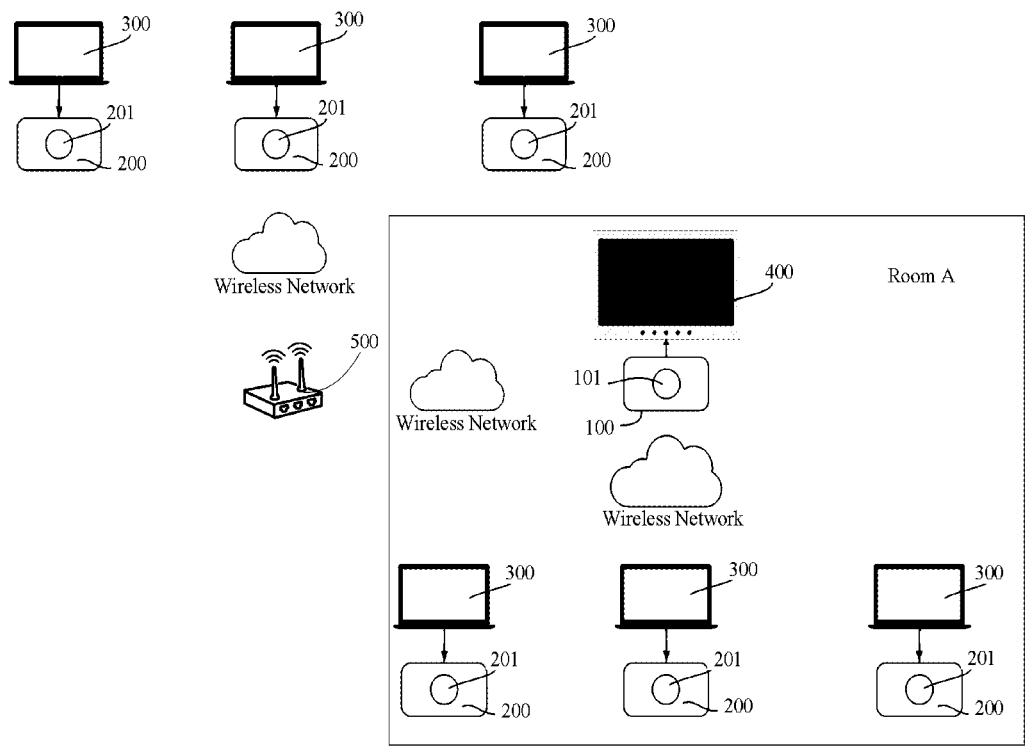
FIG. 1 is a schematic diagram of application environment for a wireless screen projection method according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
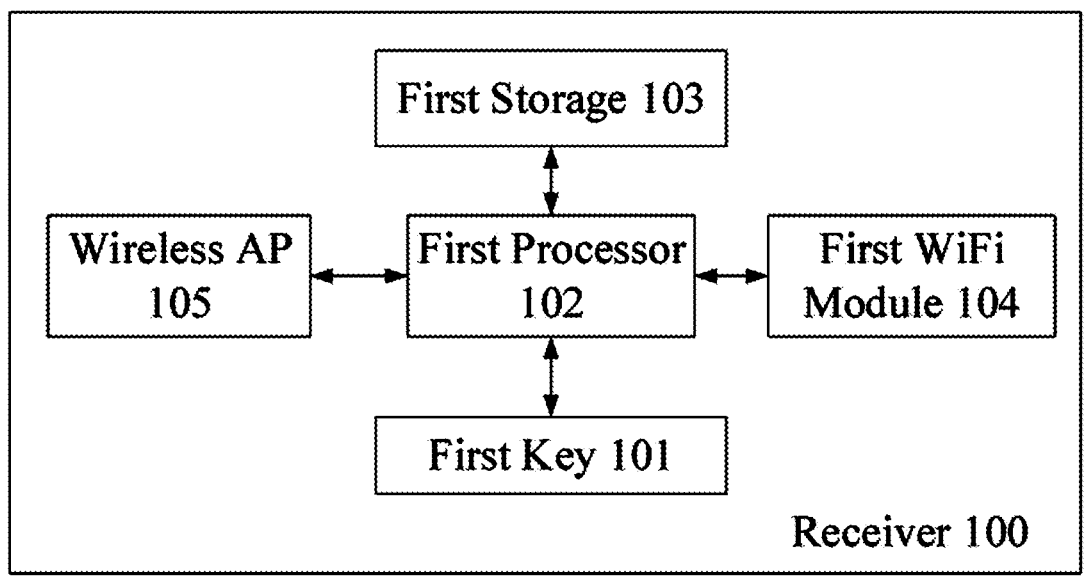
FIG. 2 is a schematic block diagram of a receiver according to one embodiment.
Figure 3:
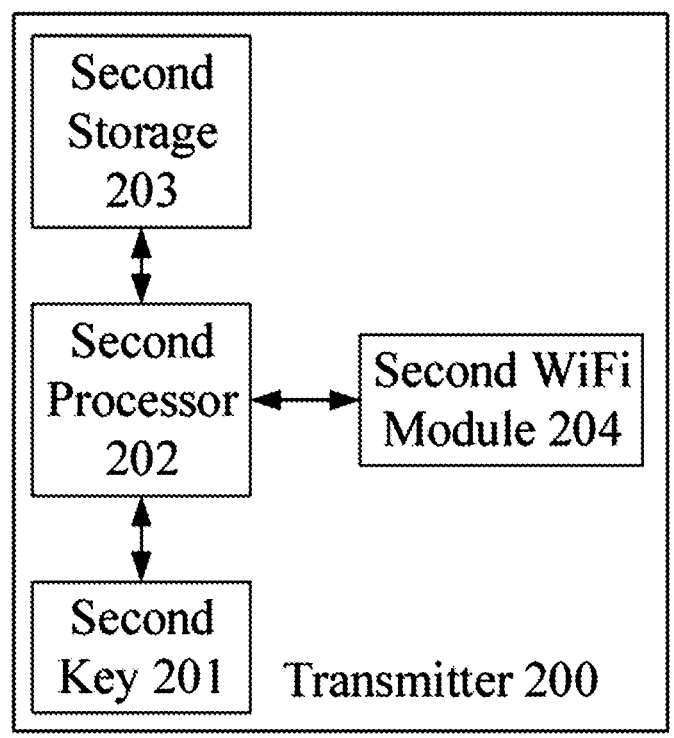
FIG. 3 is a schematic block diagram of a transmitter according to one embodiment.

FIG. 1 is an application environment diagram of a wireless screen projection method in one embodiment. In a conference, the wireless network including multiple transmitters 200, a wireless router 500 and a receiver 100 is used to build a multi-transmitter and one-receiver screen projection scenario shown in FIG. 1. In FIG. 1, room A is a conference room, and three users in the conference room are equipped with three terminal devices 300. Each terminal device 300 (e.g., laptop computer) is connected to a transmitter 200 (hereinafter referred to as "first transmitter"). There is a display device 400 in the conference room, and the display device 400 is connected with a receiver 100 that communicates with the three transmitters 200 through the wireless network. In one embodiment as shown in FIG. 2, the receiver 100 may include a first storage 103, a first processor 102, a first key 101, a wireless AP 105 (i.e., a wireless hotspot module) and a first WiFi module 104. In one embodiment as shown in FIG. 3, each transmitter 200 may include a second storage 203, a second processor 202, a second key 201 and a second WiFi module 204. Outside Room A, three users are equipped with three terminal devices 300, and each terminal device 300 (e.g., laptop computer) is connected to a transmitter 200 (hereinafter referred to as "second transmitter"). The three second transmitters communicate with the receiver 100 through the wireless router 500.

It should be noted that a first computer program and a second computer program for realizing various functions of the receiver 100 and the transmitter 200 are burned into the first storage 103 of the receiver 100 and the second storages 203 of the transmitters 200. A user only needs to operate the corresponding keys to trigger the first processor 102 of the receiver 100 and the second processors 202 of the transmitters 200 to execute the program instructions in the above-mentioned programs, thereby realizing corresponding functions. When the processors execute the computer programs, the steps in the embodiments of the wireless projection method, such as steps S202 to S210 in FIG. 4, steps S302 to S308 in FIG. 5, steps S402 to S410 in FIG. 6, steps S502 to S506 in FIG. 7, and steps S602 to S606 in FIG. 8 are implemented.

Each of the above-mentioned processors may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like.

Each of the above-mentioned storages may be an internal storage unit of the robot, such as a hard disk or a memory. Each of the above-mentioned storages may also be an external storage device of the robot, such as a plug-in hard disk, a smart memory card (SMC), and a secure digital (SD) card, or any suitable flash cards. Furthermore, each of the above-mentioned storages may also include both an internal storage unit and an external storage device. Each of the above-mentioned storages is used to store computer programs, other programs, and data. Each of the above-mentioned storages can also be used to temporarily store data that have been output or is about to be output.

Exemplarily, each of the above-mentioned computer programs may be divided into one or more modules/unit. The one or more modules/units may be a series of computer program instruction segments capable of performing specific functions, and the instruction segments are used to describe the execution process of the above-mentioned computer programs.

The flow of the corresponding steps for implementing the corresponding functions by the first processor 102 and the second processor 202 will be described in detail below with reference to the accompanying drawings and specific embodiments.

Figure 4:
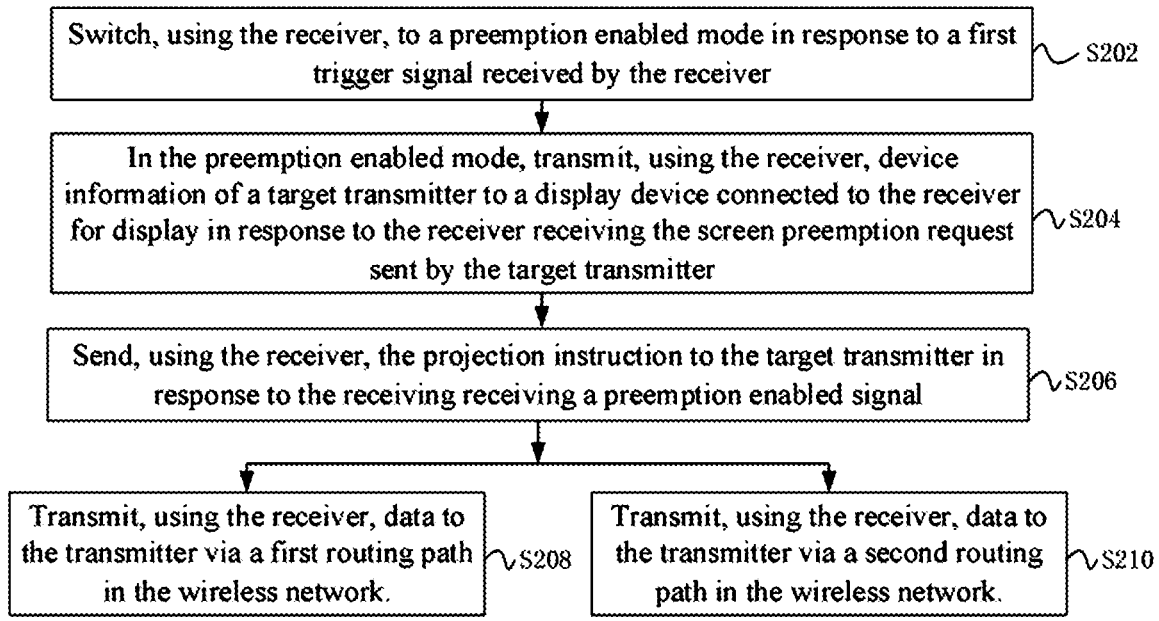
FIGS. 4-8 are exemplary flowchart of a wireless screen projection method according to different embodiments.

FIG. 4 shows an exemplary wireless screen projection method for use in a wireless network including a receiver 100, a wireless router 500 and at least one transmitter 200. The receiver 100 includes a first input module, a first WiFi module 104 and a wireless AP 105. The first input module may be a first key 101. In one embodiment, the method may include the following steps.

Step S202: Switch, using the receiver 100, to a preemption enabled mode in response to a first trigger signal received by the receiver 100 that is generated by the first input module in response to a user's first operation on the first input module.

Step S204: In the preemption enabled mode, transmit, using the receiver 100, device information of a target transmitter 200 to a display device connected to the receiver 100 for display in response to the receiver 100 receiving the screen preemption request sent by the target transmitter 200.

Step S206: Send, using the receiver 100, the projection instruction to the target transmitter 200 in response to the receiver 100 receiving a preemption enabled signal that is generated by the first input module in response to a user's enabling preemption triggering operation on the first input module or generated by the receiver 100 when a preset time period expires after the screen preemption request is received. The screen projection instruction is to trigger the target transmitter 200 to send the audio and video data of the terminal device 300 connected to the target transmitter 200 to the receiver 100 through the wireless network, such that the receiver 100 transmits the audio and video data to the display device 400 connected to the receiver 100 for display.

In step S202, if the moderator in the conference room confirms that participant A has finished his presentation, he/she double-clicks the first key 101 on the receiver 100 to trigger the receiver 100 to enter the preemption enabled mode, and informs all the participants in the conference room (i.e., room A) by voice it is time for the next participant to begin his/her presentation. Then, participant B can click the second button 201 on his/her transmitter 200 (i.e., the target transmitter) to send a screen preemption request to the receiver 100. It should be noted that the moderator can inform other participants outside room A that it is time for one of them to begin his/her presentation by posting a message in a team messaging application.

In step S204, the receiver 100 transmits the device information of the target transmitter 200 to the display device 400 connected to the receiver 100 for display in response to the received screen preemption request sent by the target transmitter 200. It should be noted that, the device information may be a nickname corresponding to the target transmitter 200 or a user name of the terminal device 300, which is convenient for the moderator to identify.

In step S206, when the moderator considers that the screen preemption request is a valid request, the moderator double-clicks the first key 101 to allow the preemption trigger operation. Then, the receiver 100 sends a screen projection instruction to the target transmitter, so that the display device 400 displays what participant B wants to demonstrate. When the moderator considers that the screen preemption request is not valid, he/she can single-click the first key 101. The receiver 100 then deletes the current screen preemption request from the message queue to ensure that the device information of the target transmitters 200 corresponding to other screen preemption requests can be displayed on the display device 400. It should be noted that, if the moderator does not perform the operation of allowing the preemption trigger, the display device 400 will always display the device information of the target transmitter 200 that sent the screen preemption request. The receiver 100 will generate a preemption enabled signal when a preset time period (for example, 10 seconds) expires after the screen preemption request is received. Then, the target transmitter 200 is allowed to preempt the screen. It can be seen that the moderator can use the receiver 100 to reject an invalid screen preemption request, so as to achieve better control over the screen projection permissions.

In the embodiment, when the receiver 100 receives a screen preemption request sent by the target transmitter 200, it will transmit the device information of the target transmitter 200 to the display device 400 connected to the receiver for display, which is convenient for the moderator to determine whether the participant corresponding to the target transmitter 200 has sent a valid request. The transmitter 200 is allowed to preempt the screen only when the moderator confirms that it is a valid request and performs a triggering operation of allowing preemption on the receiver 100, so as to manage the screen preemption permission.

In the embodiment, the moderator uses the first input module of the receiver 100 to control the screen preemption permission of each transmitter 200. The screen preemption request is initiated by each participant through the key operation of a corresponding transmitter 200. Each transmitter 200 is allowed to preempt the screen only after the moderator of the conference confirms the first operation performed by the first input module. Without increasing the workload of each participant, the screen preemption permission of each transmitter 200 is effectively controlled, which can ensure that each participant can demonstrate their display materials in an orderly manner, and maintain the order of presentation at the meeting. In one embodiment, a solution for exiting the preemption enabled mode is also provided. One of the optional solutions is that after the moderator double-clicks the first key 101 of the receiver 100 to trigger the receiver 100 to enter the preemption enabled mode and the next participant preempts the screen, the moderator in the preemption enabled mode single-clicks the first key 101 of the receiver 100 to trigger the receiver 100 to exit the preemption enabled mode. After the receiver 100 exits the preemption enabled mode, all the transmitters 200 cannot preempt the screen during the current presentation. Another optional solution is that when the moderator double-clicks the first key 101 of the receiver 100 to trigger the receiver 100 to enter the preemption enabled mode, the receiver 100 starts to count down and automatically exits the preemption enabled mode after entering the preemption permission mode for a preset time period (e.g., 10 seconds). After the receiver 100 exits the preemption enabled mode, all the transmitters 200 cannot preempt the screen during the current presentation. The scheme of automatically exiting the preemption mode can reduce the operation of the moderator and improve the user experience. In other optional solutions, the above-mentioned solutions of manually exiting the preemption enabled mode and automatically exiting the preemption enabled mode can be combined, which can prevent the moderator from forgetting to manually exit the preemption enabled mode, and improve the stability of the solutions for permission control of screen preemption. It can be understood that other solutions can be adopted to exit the preemption enabled mode, and the embodiments here are only illustrative and do not constitute a limit on the scope of protection of the present disclosure.

Step S208: Transmit, using the receiver 100, data to the transmitter 200 via a first routing path in the wireless network. The first routing path is a routing path for data transmission between the receiver 100 and the transmitter through the wireless AP 105.

Step S210: Transmit, using the receiver 100, data to the transmitter 200 via a second routing path in the wireless network. The second routing path is a routing path for data transmission between the receiver and the transmitter through the first WiFi module 104 and the wireless router 500.

Specifically, two routing paths can be selected for data transmission between the target transmitter and the receiver 100. Step S206 shows the first routing path. Step S208 shows the second routing path. In the embodiment, the existing wireless network architecture of the site can be used to perform audio and video transmission within the coverage of the network architecture. In this case, the use of up to 64 transmitters 200 is supported, so as to realize cross-room and cross-floor use.

In one embodiment, two routing paths are set for data transmission between each transmitter 200 and the receiver 100 through the wireless network. The first routing path is the direct data transmission between the transmitters 200 and the receiver 100, which is suitable for scenarios where the transmitters 200 are adjacent to the receiver 100, for example, the transmitters 200 and the receiver 100 are located in the same conference room. The second routing path is the use of the wireless router 500 as a relay device between the transmitters 200 and the receiver 100, which is suitable for scenarios where the transmitters 200 are far away from the receiver 100, for example, the transmitters 200 and the receiver 100 are located in different rooms. For example, if room A cannot accommodate multiple participants at the same time, some participants can be arranged in room B on the same floor or on different floors. The transmitters 200 of the participants located in room A is referred to as the first transmitters. The first transmitters are the transmitters 200 for data transmission with the receiver 100 via the first routing path. The transmitters 200 of the participants located in the room B are referred to as the second transmitters. The second transmitters are the transmitters 200 that perform data transmission with the receiver 100 via the second routing path.

In order to facilitate the network connection between the second transmitters and the receiver 100, the specific operation can be as follows: The second transmitters are first connected to the wireless AP 105 (i.e., a WiFi hotspot) of the receiver 100 in room A. After the connection, the receiver 100 stores a list of participating devices in the local storage. At the same time, the first WiFi module 104 of the receiver 100 is connected with the wireless router 500 and registered with the MDNS server of the wireless router 500. Then, the receiver 100 sends the ID and password of the wireless router 500 to the transmitters 200. The second transmitters are then taken to room B (the signal of wireless router 500 can cover room A and room B). The second transmitters are then connected to the wireless router 500 using the above-mentioned ID and password, and search the wireless router 500 for the device registered with the MDNS server. After finding a previously matched receiver 100, the second transmitters send the screen-projecting-related data to the IP address of the receiver 100 through the second routing path. When the receiver 100 receives a screen preemption request sent by a second transmitter in the preemption enabled mode, it sends a screen projection command to the second transmitter, so that the second transmitter can remotely perform screen projection.

Figure 5:
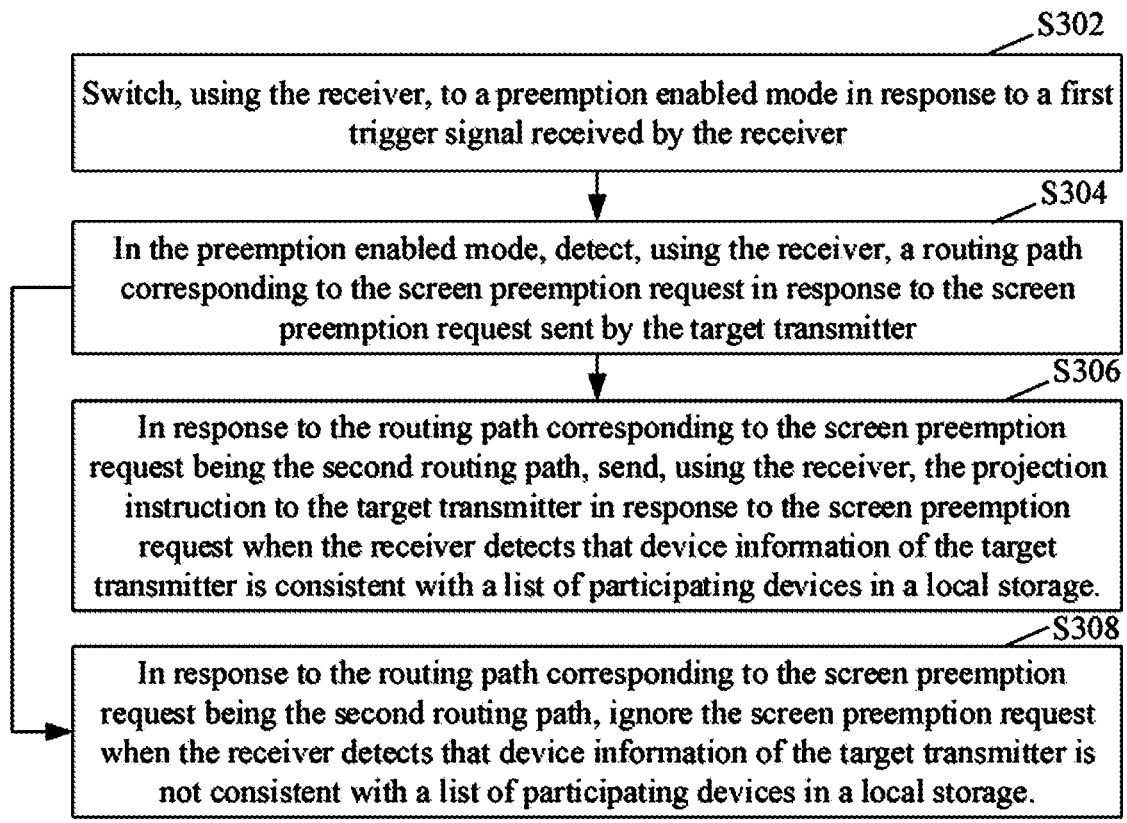

It can be understood that the first transmitters are located in room A, and it can be determined that they have the authority for screen projection. The second type of transmitter is located outside room A. Once they have the ID and password for the wireless router 500, they can access the wireless network where the receiver 100 is connected. When the receiver 100 is in the preemption enabled mode, there is a situation that a user who is authorized to participate in the conference privately performs screen projection through his/her transmitter 200. As shown in FIG. 5, in view of the above-mentioned situation, the permission control scheme needs to be further optimized as follows. The optimized method includes the following steps.

Step S302: Switch, using the receiver 100, to a preemption enabled mode in response to a first trigger signal received by the receiver 100 that is generated by the first input module in response to a user's first operation on the first input module.

In step S302, the first operation is that the moderator manually double-clicks the first key 101 of the receiver 100.

Step S304: In the preemption enabled mode, detect, using the receiver 100, a routing path corresponding to the screen preemption request in response to the screen preemption request sent by the target transmitter.

Step S306: In response to the routing path corresponding to the screen preemption request being the second routing path, send, using the receiver 100, the projection instruction to the target transmitter in response to the screen preemption request when the receiver detects that device information of the target transmitter is consistent with a list of participating devices in a local storage.

In step S306, the list of participating devices in the local storage of the receiver 100 is formed when the second transmitters are directly connected to the receiver 100 in room A, and no additional manual setting is required. Here, the device information of the target transmitter being consistent with the list of participating devices in the local storage means that the device information (device ID, device IP address, etc.) of the target transmitter has been stored in the list of participating devices.

Step S308: In response to the routing path corresponding to the screen preemption request being the second routing path, ignore the screen preemption request when the receiver detects that device information of the target transmitter is not consistent with a list of participating devices in a local storage.

In step S308, the device information of the target transmitter not being consistent with the list of participating devices in the local storage means that the device information (device ID, device IP address, etc.) of the target transmitter is not stored in the list of participating devices.

In the embodiment, the receiver 100 will automatically verify the screen preemption request from the second transmitters. If it is detected that the device information of the target transmitter is inconsistent with the list of participating devices in the local storage, the screen preemption request will be automatically ignored to realize automatic permission control, which can prevent uninvited users from joining the conference privately for screen projection, thereby facilitating the maintenance of the presentation order at the conference.

Figure 6:
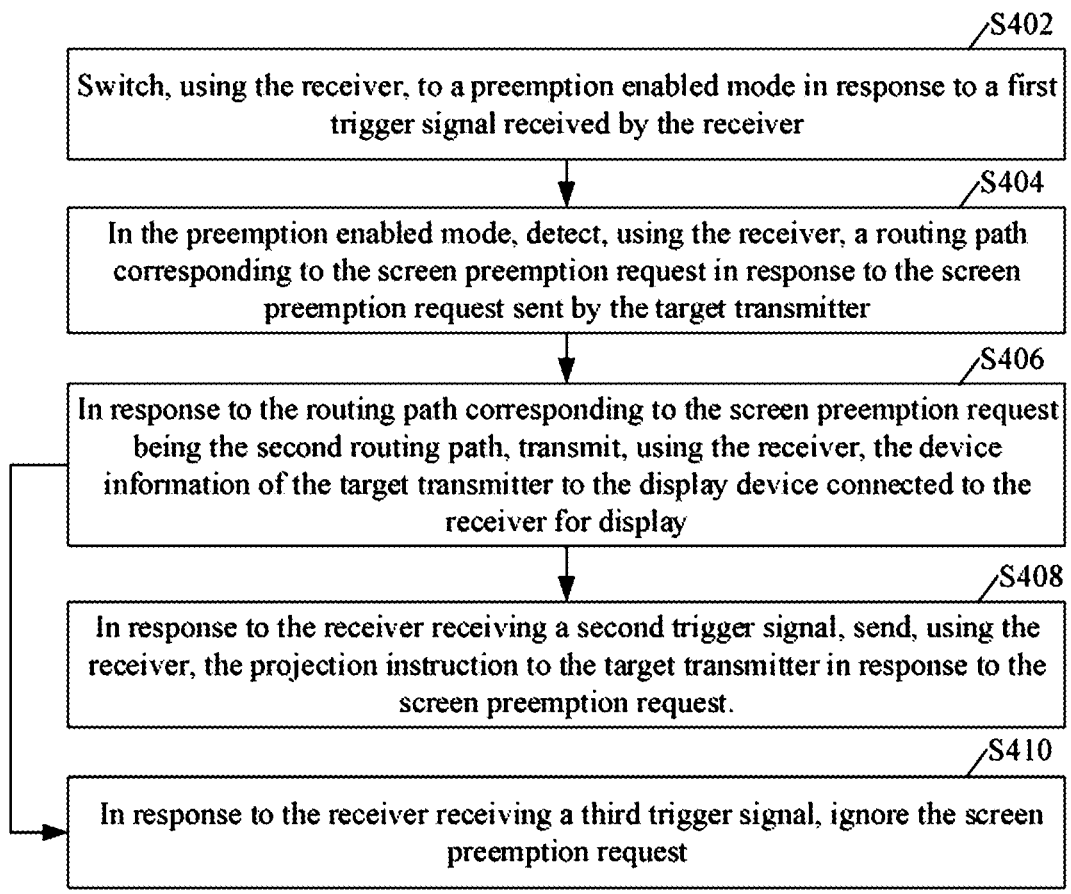

It should be noted that some participants may be temporary guests invited after the conference has begun. The second transmitters of the guests are only connected to the wireless network through the wireless router 500 when the guests are required to give a presentation. Therefore, the device information of the transmitters 200 of the guests is not stored in the receiver 100 in advance, and the receiver 100 cannot be automatically verify these transmitters 200. In this regard, as shown in FIG. 6, the following method is provided in one embodiment, and the method may include the following steps.

Step S402: Switch, using the receiver 100, to a preemption enabled mode in response to a first trigger signal received by the receiver 100 that is generated by the first input module in response to a user's first operation on the first input module.

In step S402, the first operation is that the moderator manually double-clicks the first key 101 of the receiver 100.

Step S404: In the preemption enabled mode, detect, using the receiver 100, a routing path corresponding to the screen preemption request in response to the screen preemption request sent by the target transmitter.

Step S406: In response to the routing path corresponding to the screen preemption request being the second routing path, transmit, using the receiver 100, the device information of the target transmitter to the display device 400 connected to the receiver 100 for display.

In one embodiment, in order to facilitate the moderator to accurately determine whether each target transmitter is for a participant of the conference, the device information of each target transmitter displayed on the display device 400 will be converted into content that is convenient for the moderator to identify. For example, the user name of the terminal device connected to the target transmitter will be displayed on the display device 400. For example, if the terminal device is a computer, and the user name is the administrator account name of the Windows system on the computer. Specifically, the device information of the target transmitter and the user name of the participant's terminal device can be bound and stored in the receiver 100 in advance before the conference starts. When the receiver 100 detects the screen preemption request from the target transmitter of the second routing path, the device information of the target transmitter is first identified, and the user name of the terminal device that has been stored in the local storage is displayed on the display device 400 to facilitate the moderator's verification.

Alternatively, a corresponding nickname can be bound to the target transmitter, and the moderator can enter it into the receiver 100 before the conference, so that the nickname can be used as the device information of the target transmitter that is displayed on the display device. It can be understood that other information bound to the target transmitter can also be used as the device information of the target transmitter, and the embodiments here are only illustrative and do not constitute a limit on the scope of protection of the present disclosure Step S408: In response to the receiver receiving a second trigger signal that is generated by the first input module in response to a user's second operation on the first input module, send, using the receiver 100, the projection instruction to the target transmitter in response to the screen preemption request.

In step S408, the second operation is the moderator's single-click operation on the first key 101.

Step S410: In response to the receiver receiving a third trigger signal that is generated by the first input module in response to a user's third operation on the first input module, ignore the screen preemption request.

In step S410, the third operation is a double-click operation on the first key 101 by the moderator. It should be noted that when the receiver 100 does not enter the preemption enabled mode, double-clicking the first key 101 will trigger the receiver 100 to enter the preemption enabled mode. After the receiver 100 enters the preemption permission mode, double-clicking the first button 101 will trigger the receiver 100 to ignore the screen preemption request.

In the embodiment, the screen preemption request sent by the first transmitters located in the same room as the receiver 100 does not need to be verified, that is, the convenience of screen preemption by the transmitters 200 located in the same room is not changed. The solution provided in the embodiment will verify the screen preemption request sent by the second transmitters located in a different room from the receiver 100. The moderator can quickly check whether the target transmitter belongs to the equipment of an invited member of the conference through the device information of the second transmitter (that is, the target transmitter) displayed by the display device 400, which can prevent uninvited users from joining the conference without permission to perform screen projection. It is thus easy to maintain the presentation order of the conference. Compared with the automatic permission control scheme, the manual permission control has more flexibility.

Figure 7:
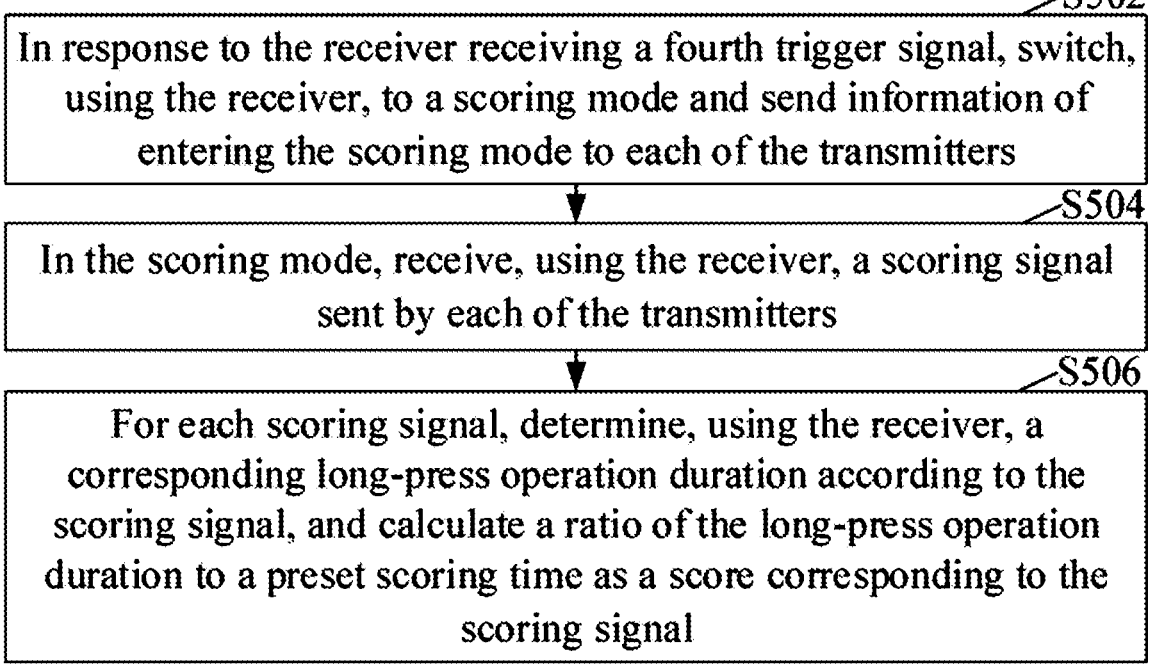
Figure 8:
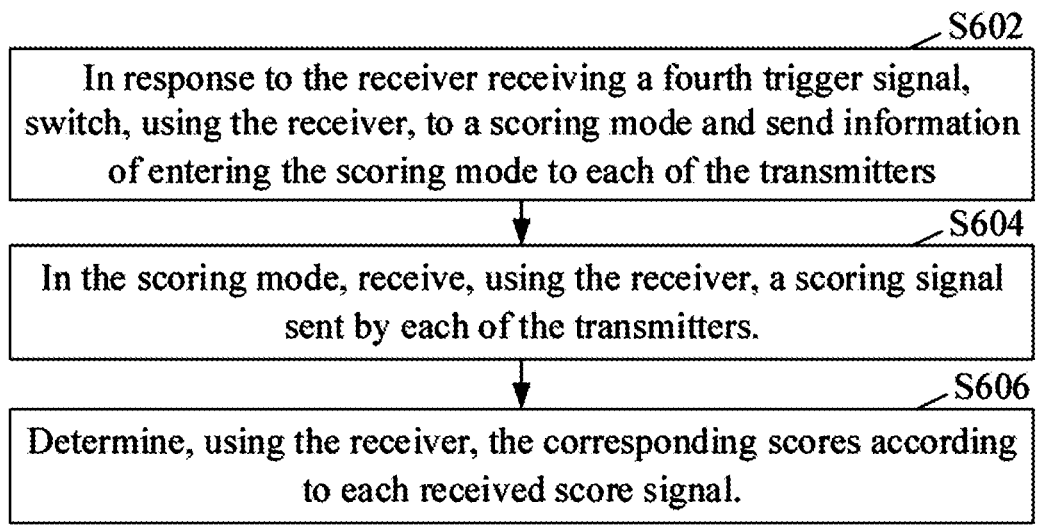

As shown in FIG. 7, in one embodiment, each transmitter 200 includes a second input module (i.e., the second key 201), and the wireless screen preemption method further includes the following steps.

Step S502: In response to the receiver receiving a fourth trigger signal that is generated by the first input module in response to a user's fourth operation on the first input module, switch, using the receiver 100, to a scoring mode and send information of entering the scoring mode to each of the transmitters 200.

In step S502, the fourth operation is the moderator's triple-click operation on the first key 101.

Step S504: In the scoring mode, receive, using the receiver 100, a scoring signal sent by each of the transmitters 200. The scoring signal is a signal generated by a corresponding one of the transmitters in response to a user's fifth operation on the second input module when the corresponding one of the transmitters receives the information of entering the scoring mode. The fifth operation is a long-press operation on the second input module.

Step S506: For each scoring signal, determine, using the receiver 100, a corresponding long-press operation duration according to the scoring signal, and calculate a ratio of the long-press operation duration to a preset scoring time as a score corresponding to the scoring signal.

In the embodiment, when the user performs the fourth operation on the first input module, it is switched to the scoring mode to score the presenters of the conference. Each transmitter 200 needs to be provided with as few keys as possible for the sake of simplicity in structure. However, in order to allow a participant to input as much content as possible through the keys of the transmitter 200 to obtain a finer score, the number of keys needs to be as large as possible. In order to solve this contradiction, in the embodiment, there is only a single key on each transmitter 200 (that is, the second input module is a single key). By using the duration of the user's long-press operation on the single key to associate with the score. That is, the ratio of the long-press operation duration to the preset scoring time is used as the score corresponding to the scoring signal. Fine scoring can be achieved without the need to add more keys on each transmitter 200. For example, if the preset scoring time is 5 seconds and the long-press operation duration corresponding to a scoring signal is 3 seconds, the corresponding score is $3/5$, that is, 0.6 points. According to different long-press operation duration corresponding to the scoring signal, the user can score between 0 and 1 at multiple levels. In one example, when the user presses the button for a long time, the transmitter 200 starts timing and collects the current voltage signal of the key (for example, the voltage signal can be a low-level signal). When the user releases the key, the transmitter 200 will count the duration of the low-level signal and generate a score signal, and send the score signal to the receiver 100. After receiving the scoring signal, the receiver 100 will calculate the score corresponding to the scoring signal. It can be understood that, in the scoring mode, the receiver 100 performs calculation based on each of the received scoring signals, and when the user's long-press operation exceeds the preset scoring time, it is regarded as a full score. When the user controls the receiver 100 to exit the scoring mode by operating the first input module, the receiver 100 will send the information of exiting the scoring mode to each transmitter 200. When a transmitter 200 receives the information of exiting the scoring mode, the scoring signal is no longer generated for the user's long-press operation on the key.

In one scenario, after a participant finishes his/her presentation, the moderator informs each participant to rate the content shown by the current participant. The moderator presses the first key 101 of the receiver 100 three times, and the receiver 100 then switches to the scoring mode. A scoring interface is then displayed on the display device 400. For example, the display device 400 may display the following text "Please prepare for rating, and press transmitter 200 within 5 seconds of countdown to rate." After 3 seconds, a 5-second countdown is displayed on the display device 400. After the countdown ends, the receiver 100 converts the received scoring signals sent by the transmitters 200 into specific scores and performs score statistics. For example, if the duration of low voltage in a certain scoring signal is 3 seconds, and the score scale ranges from 0 to 100 points, the score given by the transmitter 200 after conversion is $3/5*100=60$ points. After the score conversion is performed on the scoring signals sent by all the transmitters 200, the statistical result will be displayed on the scoring interface. The statistical result may include the device information of each transmitter 200 and the scores given by the transmitters

200. Alternatively, statistics of the average score can also be performed. In one embodiment, anonymous scoring results may be displayed on the display device 400.

Referring to FIG. 8, in one embodiment, the wireless screen projection method may further include the following steps.

Step S602: In response to the receiver receiving a fourth trigger signal that is generated by the first input module in response to a user's fourth operation on the first input module, switch, using the receiver 100, to a scoring mode and send information of entering the scoring mode to each of the transmitters 200.

In step S602, the fourth operation is the moderator's triple-click operation on the first key 101.

Step S604: In the scoring mode, receive, using the receiver 100, a scoring signal sent by each of the transmitters. The scoring signal is a signal generated by a user's operation on a numeric key of a keyboard of the terminal device connected to a corresponding one of the transmitters when the corresponding one of transmitters receives information of entering the scoring mode.

Step S606: Determine, using the receiver 100, the corresponding scores according to each received score signal.

In the embodiment, another solution is provided that enables a user to input a more accurate score value without adding more keys on the transmitter 200. That is, the numerical keys of a keyboard are used to generate scores, which is more intuitive and convenient. It can be understood that, after a transmitter 200 obtains a numerical value input by a user through a numeric key of the keyboard, it encodes the numerical value and sends it to the receiver 100. The receiver 100 receives the encoded numerical value and decodes it to obtain the numerical value entered by the user through the numeric keys of the keyboard. Since a user can enter a score through the numeric keys of the keyboard, the score range has a large degree of freedom. There are cases where the values entered by the users exceed the preset score range. For example, the preset score range is 0 to 100, but some users may input abnormal values such as 101 or −10. In this case, the receiver 100 will discard the abnormal value outside the preset score range when calculating the average score, so as to obtain an accurate average score.

In one scenario, after a participant finishes his/her presentation, the moderator informs each participant to rate the content shown by the current participant. The moderator presses the first key 101 of the receiver 100 three times, and the receiver 100 then switches to the scoring mode. A scoring interface is then displayed on the display device 400. For example, the display device 400 may display the following text "Please prepare for rating, and press transmitter 200 within 5 seconds of countdown to rate." After 3 seconds, a 5-second countdown is displayed on the display device 400. After the countdown ends, the receiver 100 converts the received scoring signals sent by the transmitters 200 into specific scores and performs score statistics. For example, if a participant enters a string of "80" by the numeric keys of the keyboard, and the score scale ranges from 0 to 100, the score is thus 80. If the string is "−20", the score is thus −20. After the score conversion is performed on the scoring signals sent by all the transmitters 200, the statistical result will be displayed on the scoring interface. The statistical result may include the device information of each transmitter 200 and the scores given by the transmitters 200. Alternatively, statistics of the average score can also be performed. However, it should be noted that since −20 is an abnormal value outside the score range, it is excluded from the calculation of the average score to ensure the accuracy of the average score statistics. In one embodiment, anonymous scoring results may be displayed on the display device 400. The transmitters 200 in the embodiment achieves the scoring function without adding additional hardware, thus enriching the functions of the conventional transmitters.

In one embodiment, a receiver 100 is provided. The receiver is suitable for use in a wireless network including the receiver 100, a wireless router 500 and at least one transmitter 200. The receiver 100 includes a first storage 103, a first processor 102, a first an input module, a first program, a first WiFi module 104 and a wireless AP 105. The first processor 102 is configured to execute the first program stored in the first storage 103, so as to implement the wireless screen projection method described above.

Another aspect of the present disclosure is directed to a non-transitory computer-readable storage medium storing instructions which, when executed, cause one or more processors to perform the methods, as discussed above. The computer-readable storage medium may include volatile or non-volatile, magnetic, semiconductor, tape, optical, removable, non-removable, or other types of computer-readable storage medium or computer-readable storage devices. For example, the computer-readable storage medium may be the storage device or the memory module having the computer instructions stored thereon, as disclosed. In some embodiments, the computer-readable storage medium may be a disc or a flash drive having the computer instructions stored thereon.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable storage medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented wireless screen projection method for a wireless network comprising a receiver that comprises a first input module, and a plurality of transmitters, comprising:

switching, using the receiver, to a preemption enabled mode in response to a first trigger signal received by the receiver that is generated by the first input module in response to a user's first operation on the first input module; and in the preemption enabled mode, sending, using the receiver, a projection instruction to a target transmitter in response to a screen preemption request sent by the target transmitter;

wherein the projection instruction is configured to trigger the target transmitter to send audio and video data of a terminal device connected to the target transmitter to the receiver through the wireless network, and the receiver is configured to transmit the audio and video data to a display device connected to the receiver;

wherein the wireless network further comprises a wireless router, the receiver further comprises a first WiFi module and a wireless AP, the plurality of transmitters comprise first transmitters and second transmitters, and the method further comprises:

transmitting, using the receiver, data to the first transmitters via a first routing path in the wireless network, and transmitting, using the receiver, data to the second transmitters via a second routing path in the wireless network, wherein the first routing path is a routing path for data transmission between the receiver and the first transmitters through the wireless AP, and the second routing path is a routing path for data transmission between the receiver and the second transmitters through the first WiFi module and the wireless router; and wherein in the preemption enabled mode, sending, using the receiver, the projection instruction to the target transmitter in response to the screen preemption request sent by the target transmitter, comprises:

in the preemption enabled mode, detecting, using the receiver, whether a routing path corresponding to the screen preemption request is the second routing path, in response to the screen preemption request sent by the target transmitter;

in response to the routing path corresponding to the screen preemption request being the first routing path, sending, using the receiver, the projection instruction to the target transmitter in response to the screen preemption request;

in response to the routing path corresponding to the screen preemption request being the second routing path, detecting, using the receiver, whether device information of the target transmitter is consistent with a list of participating devices in a local storage of the receiver;

sending, using the receiver, the projection instruction to the target transmitter in response to the screen preemption request when the receiver detects that the device information of the target transmitter is consistent with the list of participating devices; and
ignoring the screen preemption request when the receiver detects that the device information of the target transmitter is not consistent with the list of participating devices;
wherein the second transmitters are directly connected to the wireless AP of the receiver, the receiver forms and stores the list of participating devices in the local storage after the second transmitters are directly connected to the wireless AP of the receiver, at the same time, the first WiFi module of the receiver is connected with the wireless router and registered with a MDNS server of the wireless router, and the receiver sends an ID and a password of the wireless router to the second transmitters; and
a second transmitter is connected to the wireless router using the ID and the password, searches the wireless router for a previously matched receiver registered with the MDNS server, and sends the screen preemption request to the previously matched receiver through the second routing path after finding the previously matched receiver.

2. The method of claim 1, wherein each of the plurality of transmitters comprises a second input module, the method further comprises:
in response to the receiver receiving a fourth trigger signal that is generated by the first input module in response to a user's fourth operation on the first input module, switching, using the receiver, to a scoring mode and sending information of entering the scoring mode to each of the plurality of transmitters;
in the scoring mode, receiving, using the receiver, a scoring signal sent by each of the plurality of transmitters; wherein the scoring signal is a signal generated by a corresponding one of the plurality of transmitters in response to a user's fifth operation on the second input module when the corresponding one of the plurality of transmitters receives the information of entering the scoring mode, and the fifth operation is a long-press operation on the second input module; and
for each scoring signal, determining, using the receiver, a corresponding long-press operation duration according to the scoring signal, and calculating a ratio of the long-press operation duration to a preset scoring time as a score corresponding to the scoring signal.

3. The method of claim 2, wherein the first input module is a physical key, and the second input module is a physical key.

4. The method of claim 2, wherein when the receiver exits the scoring mode by a user operating the first input module, the receiver sends information of exiting the scoring mode to each of the plurality of transmitters, and when each of the plurality of transmitters receives the information of exiting the scoring mode, the scoring signal is no longer generated for the long-press operation on the key.

5. The method of claim 2, wherein a scoring interface is displayed on the display device after switching, using the receiver, to the scoring mode, and the score corresponding to the scoring signal is displayed on the scoring interface.

6. The method of claim 1, further comprising:
in response to the receiver receiving a fourth trigger signal that is generated by the first input module in response to a user's fourth operation on the first input module, switching, using the receiver, to a scoring mode and sending information of entering the scoring mode to each of the plurality of transmitters;
in the scoring mode, receiving, using the receiver, a scoring signal sent by each of the plurality of transmitters, wherein the scoring signal is a signal generated by a user's operation on a numeric key of a keyboard of the terminal device connected to a corresponding one of the plurality of transmitters when the corresponding one of the plurality of transmitters receives information of entering the scoring mode; and
determining, using the receiver, corresponding scores according to each received scoring signal.

7. The method of claim 6, wherein a scoring interface is displayed on the display device after switching, using the receiver, to a scoring mode;
the receiver calculates an average score after the corresponding scores is determined according to each received scoring signal; and
the average score is displayed on the scoring interface, wherein an abnormal value outside a score range is excluded from the corresponding scores when calculating the average score.

8. The method of claim 1, wherein sending, using the receiver, the projection instruction to the target transmitter in response to the screen preemption request sent by the target transmitter, comprises:
transmitting, using the receiver, the device information of the target transmitter to the display device connected to the receiver for display in response to the screen preemption request sent by the target transmitter; and
sending, using the receiver, the projection instruction to the target transmitter in response to a preemption enabled signal that is generated by the first input module in response to a user's enabling preemption triggering operation on the first input module or generated by the receiver when a preset time period expires after the screen preemption request is received.

9. The method of claim 8, wherein the device information of the target transmitter is a nickname corresponding to the target transmitter or a user name of a terminal device connected to the target transmitter, and the method further comprises:
in response to a user's operation on the first input module, rejecting, using the receiver, the screen preemption request sent by the target transmitter, and deleting the screen preemption request sent by the target transmitter from a message queue.

10. The method of claim 1, wherein in the preemption enabled mode, sending, using the receiver, the projection instruction to the target transmitter in response to the screen preemption request sent by the target transmitter, further comprises:
in response to the routing path corresponding to the screen preemption request being the second routing path, transmitting, using the receiver, the device information of the target transmitter to the display device connected to the receiver for display;
in response to the receiver receiving a second trigger signal that is generated by the first input module in response to a user's second operation on the first input module, sending, using the receiver, the projection instruction to the target transmitter in response to the screen preemption request; and
in response to the receiver receiving a third trigger signal that is generated by the first input module in response to a user's third operation on the first input module, ignoring the screen preemption request.

11. The method of claim 1, wherein the method further comprises:

in the preemption enabled mode, exiting, using the receiver, the preemption enabled mode in response to a user's operation on the first input module, wherein all the transmitters cannot preempt the display device during a current presentation after the receiver exits the preemption enabled mode.

12. The method of claim 1, wherein when switching, using the receiver, to the preemption enabled mode, the receiver starts to count down and automatically exits the preemption enabled mode after entering the preemption permission mode for a preset time period, and all the transmitters cannot preempt the display device during a current presentation after the receiver exits the preemption enabled mode.

13. A receiver for a wireless network comprising the receiver, a wireless router, and a plurality of transmitters, comprising:
    a first storage storing a first computer program;
    a first processor;
    a first input module;
    a first WiFi module; and
    a first wireless AP;
    wherein the first processor is configured to execute the first computer program that causes the first processor to perform the method of claim 1.

14. A non-transitory computer-readable storage medium storing instructions that, when executed by at least one processor, cause the at least one processor to perform a wireless screen projection method for a wireless network comprising a receiver that comprises a first input module, and a plurality of transmitters, the method comprising:
    switching, using the receiver, to a preemption enabled mode in response to a first trigger signal received by the receiver that is generated by the first input module in response to a user's first operation on the first input module; and
    in the preemption enabled mode, sending, using the receiver, a projection instruction to a target transmitter in response to a screen preemption request sent by the target transmitter;
    wherein the projection instruction is configured to trigger the target transmitter to send audio and video data of a terminal device connected to the target transmitter to the receiver through the wireless network, and the receiver is configured to transmit the audio and video data to a display device connected to the receiver;
    wherein the wireless network further comprises a wireless router, the receiver further comprises a first WiFi module and a wireless AP, the plurality of transmitters comprise first transmitters and second transmitters, and the method further comprises:
        transmitting, using the receiver, data to the first transmitters via a first routing path in the wireless network, and transmitting, using the receiver, data to the second transmitters via a second routing path in the wireless network, wherein the first routing path is a routing path for data transmission between the receiver and the first transmitters through the wireless AP, and the second routing path is a routing path for data transmission between the receiver and the second transmitters through the first WiFi module and the wireless router; and
    wherein in the preemption enabled mode, sending, using the receiver, the projection instruction to the target transmitter in response to the screen preemption request sent by the target transmitter, comprises:
        in the preemption enabled mode, detecting, using the receiver, whether a routing path corresponding to the screen preemption request is the second routing path, in response to the screen preemption request sent by the target transmitter;
        in response to the routing path corresponding to the screen preemption request being the first routing path, sending, using the receiver, the projection instruction to the target transmitter in response to the screen preemption request;
        in response to the routing path corresponding to the screen preemption request being the second routing path, detecting, using the receiver, whether device information of the target transmitter is consistent with a list of participating devices in the non-transitory computer-readable storage medium;
        sending, using the receiver, the projection instruction to the target transmitter in response to the screen preemption request when the receiver detects that the device information of the target transmitter is consistent with the list of participating devices; and
        ignoring the screen preemption request when the receiver detects that the device information of the target transmitter is not consistent with the list of participating devices;
    wherein the second transmitters are directly connected to the wireless AP of the receiver, the receiver forms and stores the list of participating devices in the local storage after the second transmitters are directly connected to the wireless AP of the receiver, at the same time, the first WiFi module of the receiver is connected with the wireless router and registered with a MDNS server of the wireless router, and the receiver sends an ID and a password of the wireless router to the second transmitters; and
    a second transmitter is connected to the wireless router using the ID and the password, searches the wireless router for a previously matched receiver registered with the MDNS server, and sends the screen preemption request to the previously matched receiver through the second routing path after finding the previously matched receiver.

15. The non-transitory computer-readable storage medium of claim 14, wherein each of the plurality of transmitters comprises a second input module, the method further comprises:
    in response to the receiver receiving a fourth trigger signal that is generated by the first input module in response to a user's fourth operation on the first input module, switching, using the receiver, to a scoring mode and sending information of entering the scoring mode to each of the plurality of transmitters;
    in the scoring mode, receiving, using the receiver, a scoring signal sent by each of the plurality of transmitters; wherein the scoring signal is a signal generated by a corresponding one of the plurality of transmitters in response to a user's fifth operation on the second input module when the corresponding one of the plurality of transmitters receives the information of entering the scoring mode, and the fifth operation is a long-press operation on the second input module; and
    for each scoring signal, determining, using the receiver, a corresponding long-press operation duration according to the scoring signal, and calculating a ratio of the long-press operation duration to a preset scoring time as a score corresponding to the scoring signal.

16. The non-transitory computer-readable storage medium of claim 15, wherein the first input module is a physical key, and the second input module is a physical key.

17. The non-transitory computer-readable storage medium of claim 14, wherein sending, using the receiver, the projection instruction to the target transmitter in response to the screen preemption request sent by the target transmitter, comprises:
- transmitting, using the receiver, the device information of the target transmitter to the display device connected to the receiver for display in response to the screen preemption request sent by the target transmitter; and
- sending, using the receiver, the projection instruction to the target transmitter in response to a preemption enabled signal that is generated by the first input module in response to a user's enabling preemption triggering operation on the first input module or generated by the receiver when a preset time period expires after the screen preemption request is received.

18. The non-transitory computer-readable storage medium of claim 14, wherein in the preemption enabled mode, sending, using the receiver, the projection instruction to the target transmitter in response to the screen preemption request sent by the target transmitter, further comprises:
- in response to the routing path corresponding to the screen preemption request being the second routing path, transmitting, using the receiver, the device information of the target transmitter to the display device connected to the receiver for display;
- in response to the receiver receiving a second trigger signal that is generated by the first input module in response to a user's second operation on the first input module, sending, using the receiver, the projection instruction to the target transmitter in response to the screen preemption request; and
- in response to the receiver receiving a third trigger signal that is generated by the first input module in response to a user's third operation on the first input module, ignoring the screen preemption request.

19. The non-transitory computer-readable storage medium of claim 14, further comprising:
- in response to the receiver receiving a fourth trigger signal that is generated by the first input module in response to a user's fourth operation on the first input module, switching, using the receiver, to a scoring mode and sending information of entering the scoring mode to each of the plurality of transmitters;
- in the scoring mode, receiving, using the receiver, a scoring signal sent by each of the plurality of transmitters, wherein the scoring signal is a signal generated by a user's operation on a numeric key of a keyboard of the terminal device connected to a corresponding one of the plurality of transmitters when the corresponding one of the plurality of transmitters receives information of entering the scoring mode; and
- determining, using the receiver, corresponding scores according to each received scoring signal.

* * * * *